AUTOMATIC CHANNEL CHANGEOVER AND STOPPING DEVICE FOR USE IN MAGNETIC RECORDING AND REPRODUCING APPARATUS

Filed Aug. 29, 1967 3 Sheets-Sheet 1

INVENTOR
KOZO YAMAMOTO

BY Stevens, Davis, Miller & Mosher
ATTORNEYS

INVENTOR
KOZO YAMAMOTO

BY

ATTORNEYS

INVENTOR
KOZO YAMAMOTO

BY Stevens, Davis, Miller & Mosher

ATTORNEYS

United States Patent Office 3,512,784
Patented May 19, 1970

3,512,784

AUTOMATIC CHANNEL CHANGEOVER AND STOPPING DEVICE FOR USE IN MAGNETIC RECORDING AND REPRODUCING APPARATUS

Kozo Yamamoto, Osaka, Japan, assignor to Matsushita Electric Industrial Co., Ltd., Osaka, Japan, a corporation of Japan Filed Aug. 29, 1967, Ser. No. 664,206
Int. Cl. G11b 5/00
U.S. Cl. 274—4 3 Claims

ABSTRACT OF THE DISCLOSURE

An automatic channel changeover and stopping device for use in a magnetic recording and reproducing apparatus having a single change lever which can take two operative positions and having a solenoid to which an energizing current is supplied by electrical contact between a contactor and a metal foil on a magnetic tape, so that, in one position of the change level, the motor circuit is continuously energized and the channel changeover is automatically effected by movement of a plunger operatively associated with the solenoid, while in the other position of the change lever, the above movement of the plunger automatically deenergizes the motor circuit.

BACKGROUND OF THE INVENTION

Field of the invention

This invention relates to a magnetic recording and reproducing apparatus of the multi-channel type, that is, of the movable head type, and more particularly to an automatic channel changeover and stopping device for use in the apparatus of the type described above.

Description of the prior art

Magnetic recording and reproducing apparatus of the multi-channel type known in the art are adapted to operate with a multi-channel magnetic tape of the kind in which a metal foil of aluminum or like material is bonded or otherwise fixed adjacent to the recording portions on the tape.

The known apparatus of the type described above are constructed in such a way that the metal foil on the tape causes the short circuit of a contactor and a current thereby flowing through a solenoid causes movement of an associated plunger for effecting the desired channel changeover. A device which is operative in merely stopping the operation of a magnetic recording and reproducing apparatus of the type described by the above movement of the plunger is also known in the art. However, a device of simple structure which can automatically perform both these functions, that is, the function of automatic channel changeover and the function of automatic stopping of the operation of the apparatus has not yet been developed. An attempt to obtain a device having such functions in accordance with the prior techniques as described above has inevitably resulted in a complex structure and high power consumption, and has commonly been accompanied with high manufacturing costs.

SUMMARY OF THE INVENTION

It is, therefore, the primary object of the present invention to provide an automatic channel changeover and stopping device for use in a magnetic recording and reproducing apparatus of the movable head type which is free from the prior defects as described above, and which fulfills both the functions of automatic channel changeover and automatic stopping of the apparatus, and which can positively and accurately perform both these functions in response to a mere manipulation of a changeover lever.

In accordance with the present invention, there is provided an automatic channel changeover and stopping device which has, in addition to its automatic channel changeover function, an operation stopping function such that the manipulation of a changeover lever to one of its two positions can stop the movement of a magnetic tape as soon as one reproducing operation is completed and the tape is ready to make another run for a subsequent reproducing or recording operation, and in which, during the automatic and continuous recording and reproduction of channels by the above-described automatic changeover operation, energization of a solenoid does not in any way affect the continuous operation of the motor circuit.

The above and other objects, advantages and features of the present invention will become apparent from the following description of a few preferred embodiments with reference to the accompanying drawings:

DESCRIPTION OF THE PREFERRED EMBODIMENTS

The present invention will be described with particular reference to its use in a magnetic recording and reproducing apparatus of the kind adapted to operate with an endless magnetic tape wound in a multiplicity of layers about an axis. In this kind of recording and reproducing apparatus, a metal foil is bonded or otherwise fixed to a portion of the endless magnetic tape and recordings are provided on the magnetic tape in a manner that the recordings are changed over from one channel to another at that portion so that, when the metal foil moves to the outermost position of the endlessly wound layers of the endless tape, it is contacted by a contactor to short circuit the opposite contact strips of the contactor in order to cause thereby a flow of current to the coil of a solenoid to energize the same.

However, it is to be understood that the present invention is also applicable to a conventional recording and reproducing apparatus of the automatic reciprocation type in which a magnetic tape is arranged to travel between a supply reel and a take-up reel.

Figures 1, 2, 3, 4, 5, 6:
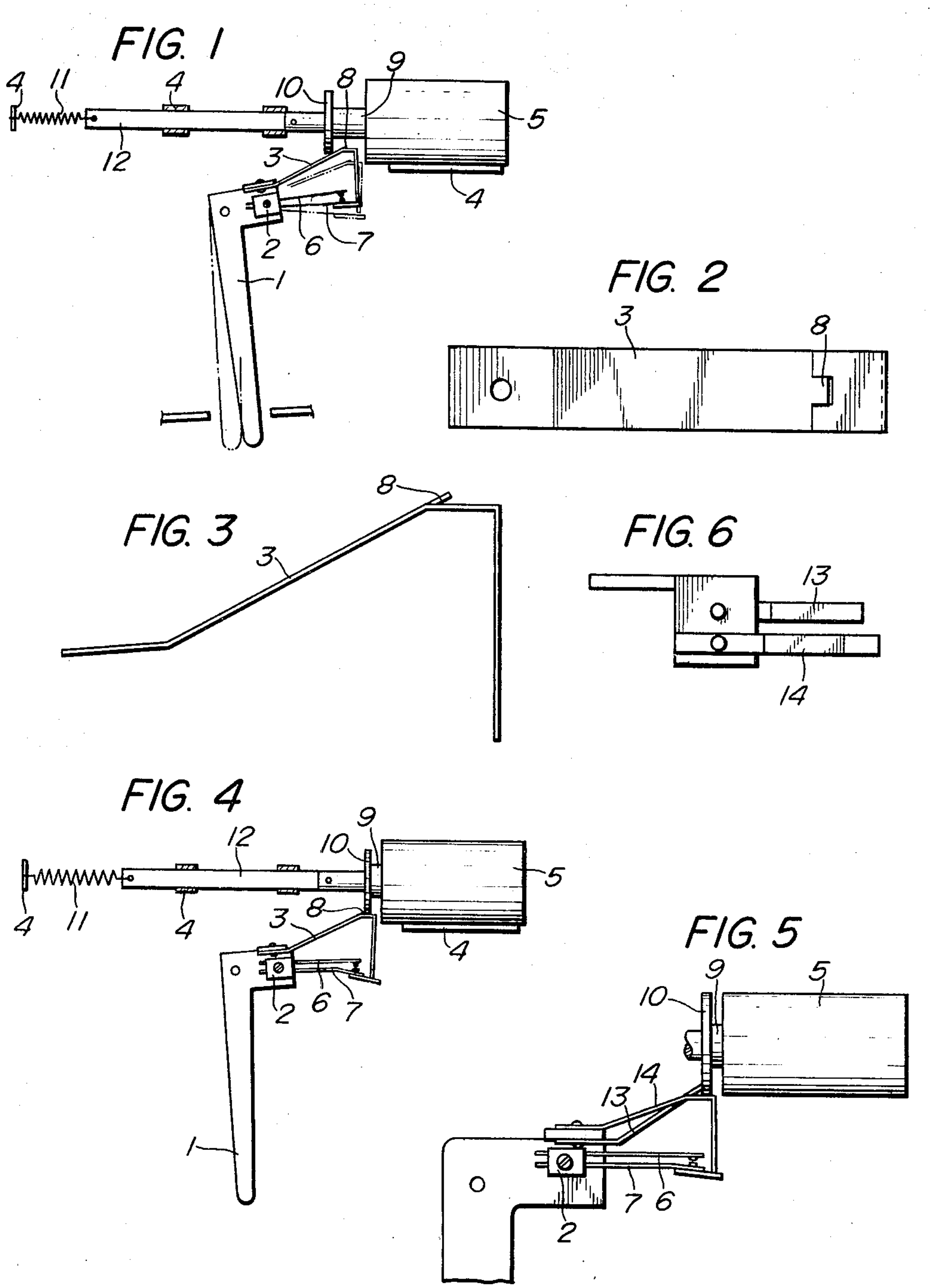
FIG. 1 is a plane view of an embodiment of the present invention, with a solenoid shown in its non-energized state.
FIG. 2 is an enlarged plane view of a leaf spring forming part of the device shown in FIG. 1.
FIG. 3 is a side elevational view of the leaf spring shown in FIG. 2.
FIG. 4 is a view similar to FIG. 1, but showing the solenoid in its energized state.
FIG. 5 is a plane view of part of a device similar to FIG. 1 but having a leaf spring of modified form.
FIG. 6 is an enlarged plane view of the leaf spring shown in FIG. 5.

The present invention will be described first with reference to FIGS. 1 to 6. The automatic channel changeover and stopping device according to the invention comprises selection or a changeover lever 1 having mounted thereon a power supply on-off switch 2 and a leaf spring 3 which are disposed opposite to a solenoid 5 fixedly mounted on a base plate 4 of a magnetic recording and reproducing apparatus. The on-off switch 2 is connected in series with a circuit for a drive motor (not shown) and is provided with a stationary contact strip 6 and a movable contact strip 7. The movable contact strip 7 of the on-off switch 2 is operatively engaged by the leaf spring 3 as shown. The leaf spring 3 is provided with an engaging lug 8 as is best shown in FIGS. 2 and 3, while a plunger 9 movable into and out of the solenoid 5 is provided at its outer end with an actuating member or engaging collar 10. The positional relation between the engaging lug 8 on the leaf spring 3 and the engaging collar 10 on the plunger 9 is such that the engaging lug 8 can engage the engaging collar 10 and lock the latter in the engaged position against the force of a return spring 11 when the changeover lever 1 is changed over from its AUTO CHANGE position to its AUTO STOP position. A shift lever 12 which can make a to-and-fro movement is connected at one end thereof to the return spring 11 anchored to the base plate 4 and at the other end thereof connected to the plunger 9. The shift lever 12 is operatively associated with a cam mechanism (not shown) for causing a vertical swinging movement of a magnetic head (not shown) so that each reciprocating movement of the lever 12 can effect the changeover of channels.

In FIG. 1 the device is shown in a state before an energizing signal is supplied to the solenoid 5, and the leaf spring 3 takes a position as shown by broken lines corresponding to the AUTO CHANGE position of the lever 12 to allow for a free changeover of channel. The channel changeover in the recording and reproducing apparatus is carried out each time the metal foil contacts the contactor and an input signal thereby appears at the solenoid 5. In the state of the leaf spring 3 shown by the broken lines, the on-off switch 2 would not be cut off since the engaging lug 8 of the leaf spring 3 would not engage the engaging collar 10 on the plunger 9 even with any to-and-fro movement of the plunger 9, and therefore also of the engaging collar 10.

FIG. 4 shows a state in which the changeover lever 12 is urged to its AUTO STOP position and an input or energizing signal is supplied to the solenoid 5. In response to the energization of the solenoid 5, the plunger 9 is attracted into the solenoid 5 so that the engaging collar 10 moving with the plunger 9 toward the solenoid 5 engages the engaging lug 8 of the leaf spring 3, which urges the movable contact strip 7 away from the stationary contact strip 6 of the on-off switch 2 to cut off the power supply. Due to the fact that the on-off switch 2 is connected in series with the drive motor circuit, the magnetic recording and reproducing apparatus is brought to a halt.

In FIGS. 5 and 6, there is shown a modification of the leaf spring employed in the device shown in FIG. 1. From FIGS. 5 and 6, it will be seen that the leaf spring employed in the above embodiment is divided into two sections, that is, an engaging leaf spring section 13 and an on-off switch controlling leaf spring section 14 so that these sections can possess and perform the respective functions.

It will be undersood that, in the device according to the present invention, a power supply on-off switch and a leaf spring having an engaging lug for the on-off control of the switch are provided on a single changeover lever. The above arrangement is advantageous in that the stroke of the leaf spring for the proper on-off control of the switch can be easily adjusted and stably maintained at a constant value when it is properly set. The invention is further advantageous in that the attraction force of the solenoid is not reduced since the power supply on-off switch and the engaging lug of the leaf spring are held free from any engagement with the plunger of the solenoid during the channel changeover operation, and the device has a simple structure and can be manufactured easily at low cost. Further, the device according to the present invention is especially effective for use in a battery-operated recording and reproducing apparatus for which any wasteful consumption of electric power is objectionable.

Figure 7:
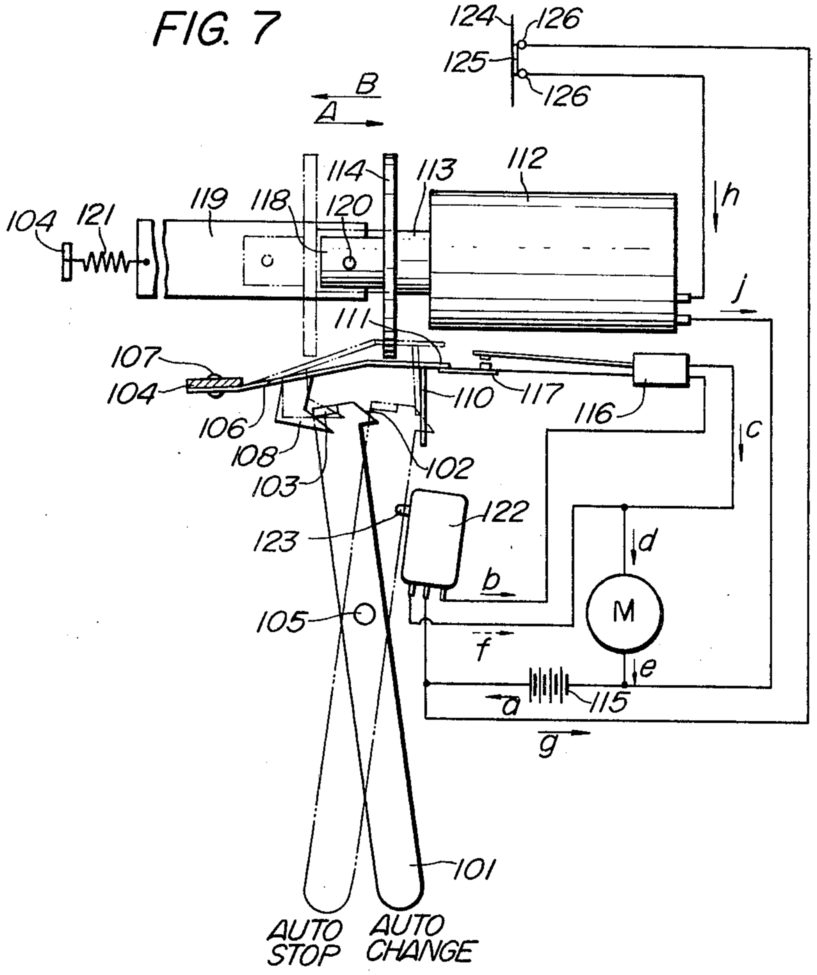
FIG. 7 is a plane view showing another embodiment of the present invention, with a changeover lever shown in its automatic channel changeover position.
Figures 8, 9:
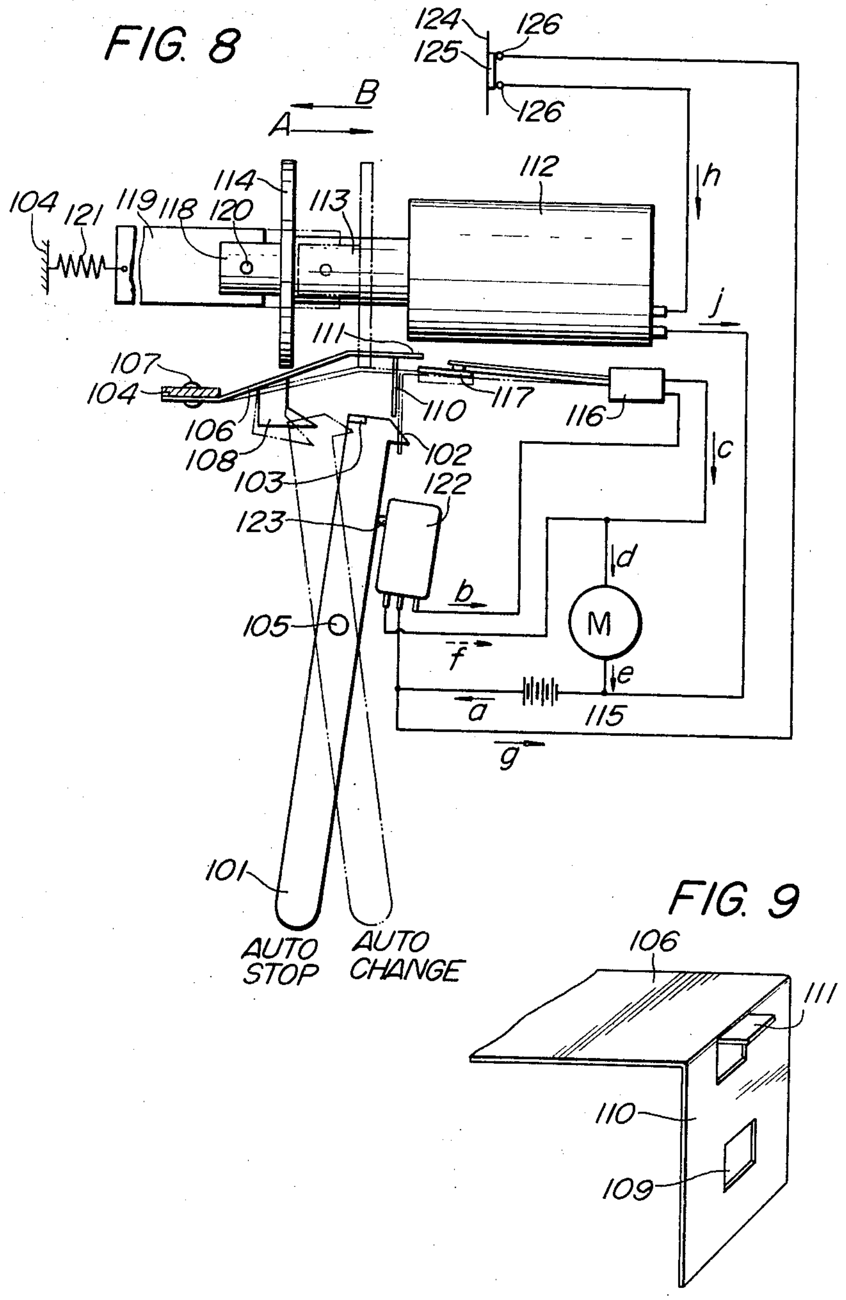
FIG. 8 is a view similar to FIG. 7, but showing the changeover lever in its automatic stopping position.
FIG. 9 is an enlarged perspective view of part of a leaf spring employed in the device shown in FIG. 7.

Another embodiment of the present invention will next be described with reference to FIGS. 7 to 9. The automatic channel changeover and stopping device in the form shown in FIGS. 7 to 9 comprises a changeover lever 101 which can take two operative positions, that is, an AUTO STOP position and an AUTO CHANGE position. The changeover lever 101 is swingably mounted at its substantially middle portion on a base plate 104 by means of a pivot pin 105, and a sharp-pointed nose portion 102 and a depending ear portion 103 are provided at the right-hand side and the left-hand side, respectively, of the rear end of the changeover lever 101. A changeover leaf spring 106 is fixed at one end thereof to the base plate 104 by a pin 107, and is provided at its substantially middle portion with an engaging tongue 108. The other or free end of the changeover leaf spring 106 is bent to form an actuating portion 110 having a perforation 109 board therethrough, and an engaging lug 111 extends from the bent portion as is best shown in FIG. 9. The engaging tongue 108 of the changeover leaf spring 106 is so positioned that it is engageable with the depending portion 103 of the changeover lever 101 when the lever 101 is moved from its AUTO STOP position to its AUTO CHANGE position.

A solenoid 112 is securely fixed to the base plate 104, and a plunger 113 is associated therewith so as to be movable into and out of the solenoid 112. An actuating member or engaging collar 114 is fixed to the plunger 113 and is so interrelated with the changeover leaf spring 106 that it engages and urges the leaf spring 106 from the position shown by solid lines in FIG. 8 to a position shown by the broken lines when the solenoid 112 is energized and the plunger 113 is attracted into the solenoid 112 under the AUTO STOP position of the changeover lever 101. When the changeover leaf spring 106 is urged to its position shown by the broken lines in FIG. 8 by being engaged and forced by the collar 114, the nose portion 102 of the changeover lever 101 engages the perforation 109 in the actuating portion 110 of the changeover leaf spring 106, and the engaging lug 111 of the changeover leaf spring 106 engages and urges a movable contact strip 117 away from a stationary contact strip of an on-off switch 116 connected to a power supply 115 so that the on-off switch 116 is urged to its open position. The outer end 118 of the plunger 113 is connected by a pin 120 with one end of a to-and-fro movable shift lever 119 which is operatively associated with a mechanism for moving a magnetic head (not shown). A plunger spring 121 is anchored to the other end of the shift lever 119 and to a portion of the base plate 104 so as to normally bias the plunger 113 toward that portion of the base plate. A microswitch 122 is securely fixed to the base plate 104 at such a position that its movable lug 123 is forced into the switch 122 by the side face of the changeover lever 101 when the lever 101 is moved to its AUTO STOP position. A magnetic tape 124 is arranged to move past a contactor 126 so that opposite contacts of the contactor 126 are shorted to energize the solenoid 112 when a foil 125 of conductive metal bonded or otherwise fixed to the tape 124 moves past the contactor 126.

The device having the structure as described above operates in the manner as described below. When the changeover lever 101 is urged to its AUTO CHANGE position as shown in FIG. 7, the depending portion 103 at the lefthand side of the rear end of the changeover lever 101 engages the tongue 108 of the changeover leaf spring 106, which is thereby urged to a position as shown by solid lines. The on-off switch 116 is urged to its open position by the above movement of the changeover leaf spring 106, but due to the fact that the movable lug 123 of the microswitch 122 is restored to its projecting position, a common terminals COM. and a normally closed terminal N.C. of the microswitch 122 are shorted while the remaining normally open terminal N.O. is in its open state, with the result that the current from the power supply 115 flows in a direction of $a \rightarrow f \rightarrow d$ to drive the motor M independently of the open or closed position of the on-off switch 116. When, under the above state, the metal foil 125 moves past the contactor 126 to temporarily short-circuit the opposite contacts of the contactor 126, the current from the power supply 115 now flows in a direction of $a \rightarrow g \rightarrow h \rightarrow j$ to temporarily energize the solenoid 112, with the result that the plunger 113 urges the shift lever 119 in a direction as shown by arrow A and then in a direction as shown by arrow B thereby moving the magnetic head through one step for the channel changeover. During the above movement of the plunger 113, no contact between the collar 114 and the changeover leaf spring 106 can take place because the leaf spring 106 is in the position shown by the solid lines. This means that the movement of the plunger 113 is in no way obstructed by the changeover leaf spring 106.

When the changeover lever 101 is changed over to its AUTO STOP position, that is, the position shown by the solid lines in FIG. 8, then the movable lug 123 is depressed into the microswitch 122 so that the terminals COM. and N.O. are now short-circuited and the terminal N.C. is urged open. In the above position of the changeover lever 101, the plunger 113 of the solenoid 112 takes its leftward position by being biased by the plunger spring 121 and the collar 114 in its position shown by the solid lines is not brought into contact with the changeover leaf spring 106 until the metal foil 125 on the magnetic tape 124 moves past the contactor 126. Since, therefore, the on-off switch 116 is in its closed position shown by the solid lines, the current from the power supply 115 flows in a direction of $a \rightarrow b \rightarrow c \rightarrow d \rightarrow e$ to drive the motor M. When the metal foil 125 on the magnetic tape 124 short-circuits the opposite contacts of the contactor 126, the current flows through the solenoid 112 to energize the same, and the plunger 113 is urged in the direction shown by the arrow A against the force of the plunger spring 121, which thereby accumulates energy therein. At the extremity of the movement of the plunger 113 in the direction A, the plunger 113 urges the changeover leaf spring 106 to such a position that the nose portion 102 of the changeover lever 101 engages the perforation 109 in the changeover leaf spring 106, which is thereby kept in the position shown by the broken lines. During the above movement of the leaf spring 106, the movable contact strip 117 is urged away from the stationary contact strip to open the on-off switch 116 for thereby stopping the rotation of the motor M. When the metal foil 125 on the magnetic tape 124 has moved away from the contactor 126, the solenoid 112 is deenergized and the resilient return force accumulated in the plunger spring 121 urges the plunger 113 in the direction B to restore the plunger 113 to its normal non-operative position. The shift lever 119 moving in unitary relation with the plunger 113 in the direction A and then in the direction B shifts the magnetic head through one step for the channel changeover.

From the foregoing description it will be understood that the plunger in the device according to the invention is not engageable with the changeover leaf spring when the changeover lever is in its AUTO CHANGE position. This arrangement is advantageous in that the attractive force to be imparted to the plunger can be remarkably reduced and a small force suffices to apply the required pull to the plunger since the force required to effect such a pull is solely determined by the resiliency of the plunger spring. The above advantage has the merits including a small installation space, a small capacity of the power supply, and an extended service life of the power supply on-off switch in contrast to the prior requirement of a large force to effect the desired pull for the plunger which results in a large capacity of the power supply and a bulky volume of the solenoid itself.

Further, the inventive arrangement in which the power supply on-off switch is urged to its open position in the AUTO CHANGE position of the changeover lever, the microswitch is utilized to provide the necessary current path to effect the desired changeover of channels, and the collar on the plunger is not engageable with the changeover leaf spring at such a position of the changeover lever is advantageous in that any on-off operation of the power supply switch does not take place and thus the voice circuit is free from the objectionable effect of noise that may be developed during the on-off operation of the power supply switch.

At will be further appreciated that the simple and easy channel changeover by mere manipulation of the single changeover lever from its AUTO STOP position to AUTO CHANNEL CHANGE position eliminates the troublesome operation encountered with the prior device of this kind, and the provision of the AUTO STOP position obviates the need for carefully watching the magnetic tape until the metal foil thereon moves past the contactor.

I claim:

1. An automatic channel changeover and stopping device for use in a magnetic recording and reproducing apparatus of the movable head type comprising a changeover lever having two operative positions, a solenoid provided with a plunger which is movable into and out of said solenoid, a changeover leaf spring means adapted to be actuated by said plunger and engageable with said changeover lever, and circuit means including a contactor for supplying an energizing signal to said solenoid in response to electrical contact of said contactor and a metal foil on a magnetic tape, said changeover leaf spring means being integrally provided with means which is operatively associated with said changeover lever so that the device operates in response to the energization of said solenoid to effect the automatic changeover of channels or the automatic stopping of the apparatus depending on one or the other position of said changeover lever.

2. An automatic channel changeover and stopping device for use in a magnetic recording and reproducing apparatus of the movable head type according to claim 1, in which said means integral with said changeover leaf spring means comprises a first member which is operative to lock said changeover leaf spring means against said changeover lever when said changeover lever takes its automatic channel changeover position so that said changeover leaf spring means can be held free from any actuation by an actuating member on said plunger for the automatic changeover of channels, and a second member which is operative to engage said changeover lever and lock said changeover leaf spring means againts said changeover lever when said changeover lever takes its automatic stopping position and said changeover leaf spring means is actuated by the actuating member on said plunger for the automatic stopping of the apparatus.

3. An automatic channel changeover and stopping device for use in a magnetic recording and reproducing apparatus of the movable head type according to claim 1, in which a circuit including said contactor for energizing said solenoid, and a motor circuit including a motor, a first switch means adapted to be urged by said changeover leaf spring means and a second switch means adapted to be urged by said changeover lever are connected in parallel with each other with respect to a power supply so that, in the automatic channel changeover position of said changeover lever, said changeover leaf spring means is locked by said changeover lever and is thereby held free from any actuation by the actuating member on said plunger regardless of the movement of said plunger and said motor circuit is continuously placed in its energized state, while in the automatic stopping position of said changeover lever, said changeover leaf spring means is actuated by the actuating member on said plunger by the movement of said plunger in response to the energization of said solenoid and is thereby engaged and locked by said changeover lever and said first and second switch means are connected in series with each other whereby the opening of said first switch means deenergizes the motor circuit.

References Cited

UNITED STATES PATENTS 2,514,578 7/1950 Heller.
2,670,212 2/1954 Heller -------------- 274—46

2,668,059 2/1954 Roberts.
3,257,515 6/1966 Nokamatsu.

ROBERT B. HULL, Primary Examiner

D. A. DEARING, Assistant Examiner

U.S. Cl. X.R.

179—100.2; 335—73